United States Patent

[11] 3,549,854

| [72] | Inventor | David Sciaky<br>999 North Lake Shore Drive, Chicago, Ill. 60611 |
|---|---|---|
| [21] | Appl. No. | 733,728 |
| [22] | Filed | Apr. 30, 1968 |
| [45] | Patented | Dec. 22, 1970 |

[54] ELECTRON BEAM WELDING METHOD
4 Claims, 3 Drawing Figs.

[52] U.S. Cl................................................. 219/121, 219/117
[51] Int. Cl................................................. B23k 15/00
[50] Field of Search.................................... 219/121, 121EB, 117, 137, 125, 72, 69; 250/49.5(o)

[56] References Cited
UNITED STATES PATENTS
3,136,882  6/1964  Radtke.

| 3,136,883 | 6/1964 | Radtke. | |
| 3,219,792 | 11/1965 | Pederson. | |
| 3,301,993 | 1/1967 | Boyd et al..................... | 219/121 |
| 3,426,173 | 2/1969 | Steigerwald................. | 219/121 |
| 3,437,785 | 4/1969 | Sciaky.......................... | 219/121 |

*Primary Examiner*—J. V. Truhe
*Assistant Examiner*—R. E. O'Neill
*Attorney*—Julius L. Solomon

ABSTRACT: This disclosure relates to a method and apparatus for electron beam welding by which large structures may be welded without it being necessary to place these structures within a large vacuum chamber. By the method of this invention, a small area surrounding the point at which the welding is being done is sealed off from the atmosphere by a small chamber upon which is mounted the electron beam gun.

INVENTOR.
DAVID SCIAKY
BY Julius L. Solomon

INVENTOR.
DAVID SCIAKY
BY Julius L. Solomon

ELECTRON BEAM WELDING METHOD

In the usual method of electron beam welding, a beam of electrons is generated in an electron gun and the beam is focused by either electrostatic or electromagnetic means onto the seam which is to be welded on the workpiece. The electron gun is mounted within the vacuum chamber; or on the outer surface of the chamber with a connecting opening to the inside of the chamber, and the work must be inside the chamber. Because of the necessity of placing the work within the chamber, the size of parts that may be welded is limited to the size of the chamber. For the building of large structures, such as reactor core vessels, pressure vessels, large pipes in long lengths, missiles and aircraft, the cost of manufacturing a vacuum chamber which would house these structures and the associated equipment for moving the electron beam gun or the work becomes prohibitive. There exist a few space chambers which may be large enough to house these large vessels, but because of their huge size, these vacuum space chambers require exceedingly long periods of time to be evacuated after the parts which are to be welded are placed inside the chamber.

Large vessels, as mentioned above, are welded at the present time by the arc-welding process. In the welding of heavy gauges of material, it is necessary to prepare the joints to be welded by either forming a V-groove or a J-groove at the joint and then welding the seam in a series of passes. The preparation of the groove and the welding of the several passes requires an exceedingly long period of time. The great amount of heat supplied to the material while it is being welded by the arc welding process causes great distortion of the parts and it is necessary to provide elaborate and large clamping fixtures in order to hold the parts in place.

Because of the above disadvantages, a method which does not require placing these large structures within a vacuum chamber, is very desirably. Several attempts have been made in the past, but the methods proposed have not been completely successful since the material utilized for sealing the seam would contaminate the weld or the process required the continuous evacuation and refilling of volumes which limited the speed at which the welding could be accomplished and also required the rapid cycling of valves and pumps. Another method required that the area to be welded be maintained at a very high vacuum.

It is, therefore, an object of my invention to weld large structures by means of an electron beam.

It is an object of my invention to electron beam large structures without the necessity of placing the complete structure within a vacuum chamber.

It is a further object of my invention to weld at a higher pressure than the pressure required within the electron gun.

It is a further object of my invention to weld at relatively high speeds.

It is a further object of my invention to weld heavy thicknesses of material without the necessity of special joint preparation of the butting edges.

It is a further object of my invention to allow the use of relatively simple pumping sequences and low capacity vacuum-pumping equipment in the welding of large structures.

Another object is to allow production of smooth surface welds.

Still another object is to allow welding over unlimited lengths.

It is another object of this invention to allow the welding of heavy sections without the use of joint preparation and in a single pass so as to add a minimum of heat to the parts being worked and thus reduce distortion to a minimum.

In the process, in accordance with this invention, the parts which are to be welded are abutted and clamped and the edges forming the seam upon which the beam is to impinge are lightly welded by the arc-welding process using a minimum of current. The seam at the ends and a short portion of the seam at either end of the opposite side of the plates to be welded, are sealed either with a light arc-welding pass or by means of a tape. A backup fixture is placed around the lower seam extending onto the already lightly welded ends. The backup fixture having a seal around its periphery thus forms a chamber of low volume which extends along the length of the under part of the seam. This space is pumped out through an orifice in the backup fixture by means of a mechanical pump to approximately 100 microns. The electron gun which is pumped to a high vacuum of $10^{-4}$ to $10^{-5}$ millimeters of mercury is mounted on a structure which includes a small vacuum chamber which lies along the axis of the gun and which is connected to the chamber in the gun by means of a small orifice. The small chamber is evacuated by a mechanical pump and maintained at a pressure of approximately 100 microns. The lower opening of the small chamber is surrounded by a continuous seal which is applied to the workpiece and thus seals off a small localized area of the work so that the volume adjacent to this localized area is maintained at the pressure of 100 microns. A second continuous seal is placed concentric to and outside the first seal so as to form a second small volume chamber in the form of an annular ring. This small volume is pumped out through a passageway in the structure to a pressure of approximately 100 microns. In this way the pressure on the inner seal is equalized on both sides of the inner seal. By directing the electron beam generated in the electron gun and focusing it onto the desired line of weld and moving the gun and sealing structure along the seam, a weld may be realized along the full length of the seam. As the gun is moved along, the leading edge of the seal is in contact with and seals the already lightly arc welded seam and the diametrically opposite trailing edge of the seals rides over the newly formed electron beam welded seam. In most cases, the newly electron beam welded seam will be smooth and the silicon rubber seals will effectively seal against the atmospheric pressure so that the pressure within the inner chamber where the welding is being performed is maintained at approximately 100 microns. Should the electron beam welded seam be rough, it may be covered by a smooth sealing tape at a point immediately behind the place of impingement of the beam. In other words, the tape may be applied between the beam and the first inner seal. Since the tape is not struck by the beam, there is no danger of contaminating the work by the foreign material present in the tape.

The invention may be best understood from the following detailed description thereof having reference to the accompanying drawings in which.

Figure 1:
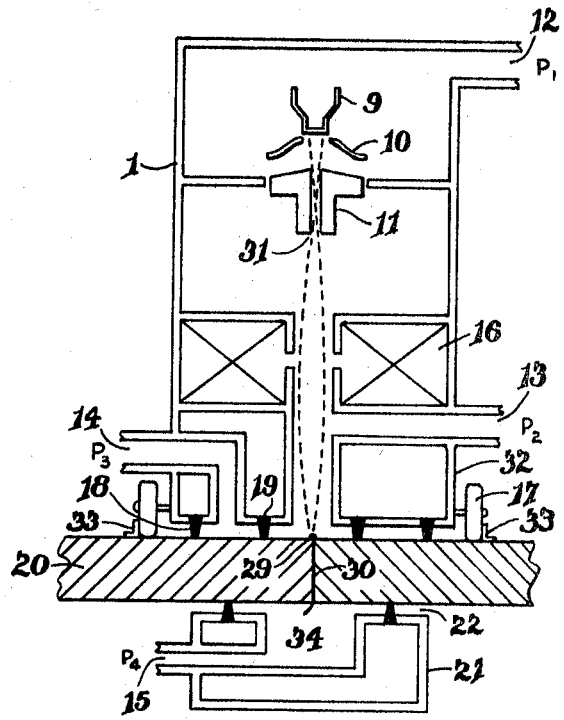
FIG. 1 is a diagrammatic, longitudinal section of the apparatus utilized for practicing the method of the invention.

FIG. 1 is a representation of the equipment used to practice the invention as applied to the welding of two adjoining plates. The plates 20 to be welded are shown adjoining each other at the line 30. The electron beam gun 1 comprising a filament 9, cathode electrode 10, and anode 11 generates a converging electron beam which is directed along the axis of the gun, passes through the orifice and the anode 11 through the electromagnetic focusing lens 16 which focuses the beam upon the joint to be welded. The chamber above the anode containing the cathode and the filament is maintained at a pressure lower than $10^{-4}$ by Torr by a pump P1 (not shown) connected to the pumping port 12. A continuous seal 19 supported in a groove which is either circular or elliptical under the carriage 32 in which the gun is supported forms a small sealed volume around the area to be welded which is maintained at a pressure of from 50 to 100 microns, by means of a pump P2, not shown, which is connected to the pumping port 13. The cylindrical space through which the electron beam must travel in its path from below the anode aperture to the work is thus maintained at approximately 100 microns. A second continuous seal 18 is supported in a second circular or elliptical groove surrounding the first seal, thus forming a small annular volume between the two seals which is pumped out by a third pump P3, not shown, through the pumping port 14. Prior to electron beam welding, the two plates are welded to each other lightly by means of a low current arc sealing pass along the full length of the intended seam at 29. Rollers 17 are provided so that the carriage 32 carrying electron beam gun 1 may be moved along the desired line of weld. The rollers may be guided along the proper path by the rails 33. A backup fixture 21 is provided underneath the seam to be welded and supports a continuous seal 22 which encloses and surrounds completely the abutting edges which are to be welded along their complete length. The chamber 34 formed by the encircling seal and backup device 21 is evacuated through port 15 by a mechanical pump which maintains the pressure underneath the seam at approximately 100 microns. If the ends of the plates to be welded are sealed by tape or other suitable seal, the total length of the desired seam may be welded at relatively high rates of speed by moving the gun along the guides the full length of the required seam. The mechanical pumps are carried along with the electron gun and carriage and maintain the pressure on either side of the welded joint below 100 microns. The weld produced will be of the same quality as the welds produced at a pressure of $10^{-4}$ Torr, and there will be no deterioration of the weld inasmuch as the pressure is maintained at a sufficient low level to avoid oxidation. Heavy and large plates which could not conveniently be placed in a vacuum chamber can thus be welded. It is not necessary to build a huge vacuum chamber can thus be welded. It is not necessary to build a huge vacuum chamber to enclose the part, it is only necessary to build the relatively inexpensive and small volume sealing backup fixture to enclose the back of the desired seam along its full length.

Figure 2:
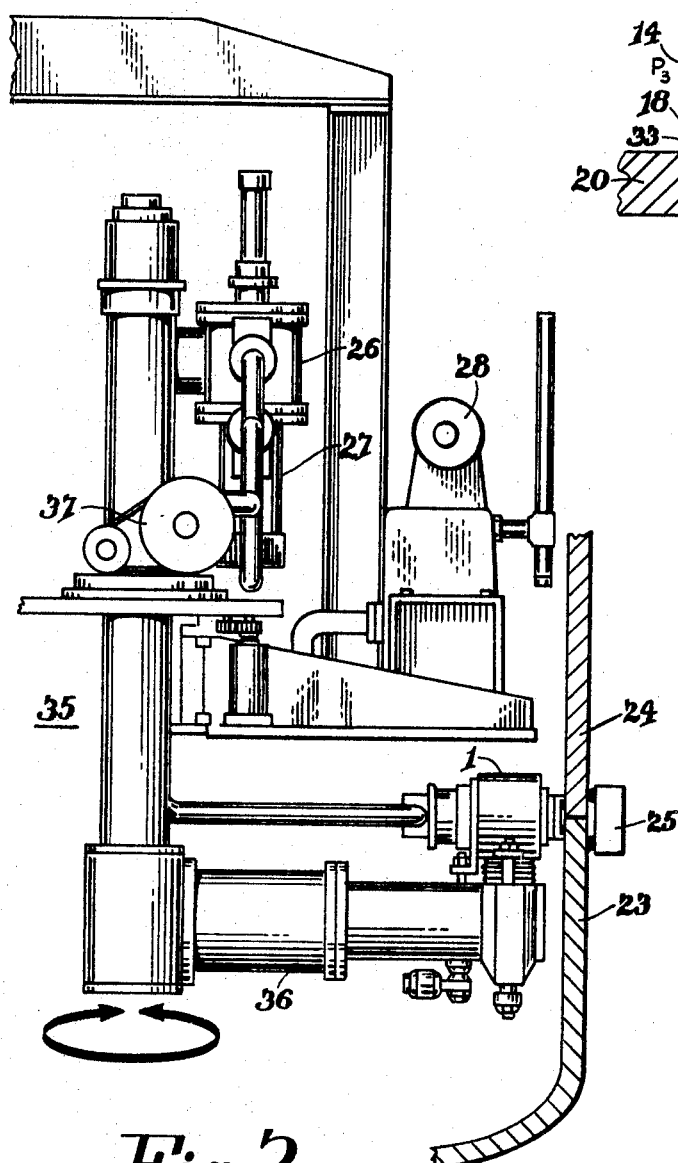
FIG. 2 illustrates the application of the method to the welding of large cylindrical tanks.

FIG. 2 illustrates an apparatus which may be utilized for the electron beam welding by this method of cylindrical tanks of large diameter and heavy cross section. The tubular section 24 is to be welded to the dome 23 in order to form a cylindrical tank. The apparatus 35 carries the electron gun 1 and carriage 32 on an arm 36 which is arranged to rotate about the axis marked as the center line. The diffusion pump 27, poppet valve 26, and mechanical pumps 28 and 37, are mounted so as to rotate with the gun. The pumping equipment maintains the various areas in the gun at the proper pressures. A backup sealing fixture 25 surrounds completely the outside of the seam to be welded. After welding lightly by means of the arc-welding process, the entire inside corner of the abutting edges of the two parts, the electron beam gun is aligned over the seam and the electron beam weld made by rotating the gun at the desired rate of welding speed. The seals on the backup device 25 may be of the inflatable type so that they may be easily removed after the welding is accomplished by deflating the seal.

Figure 3:
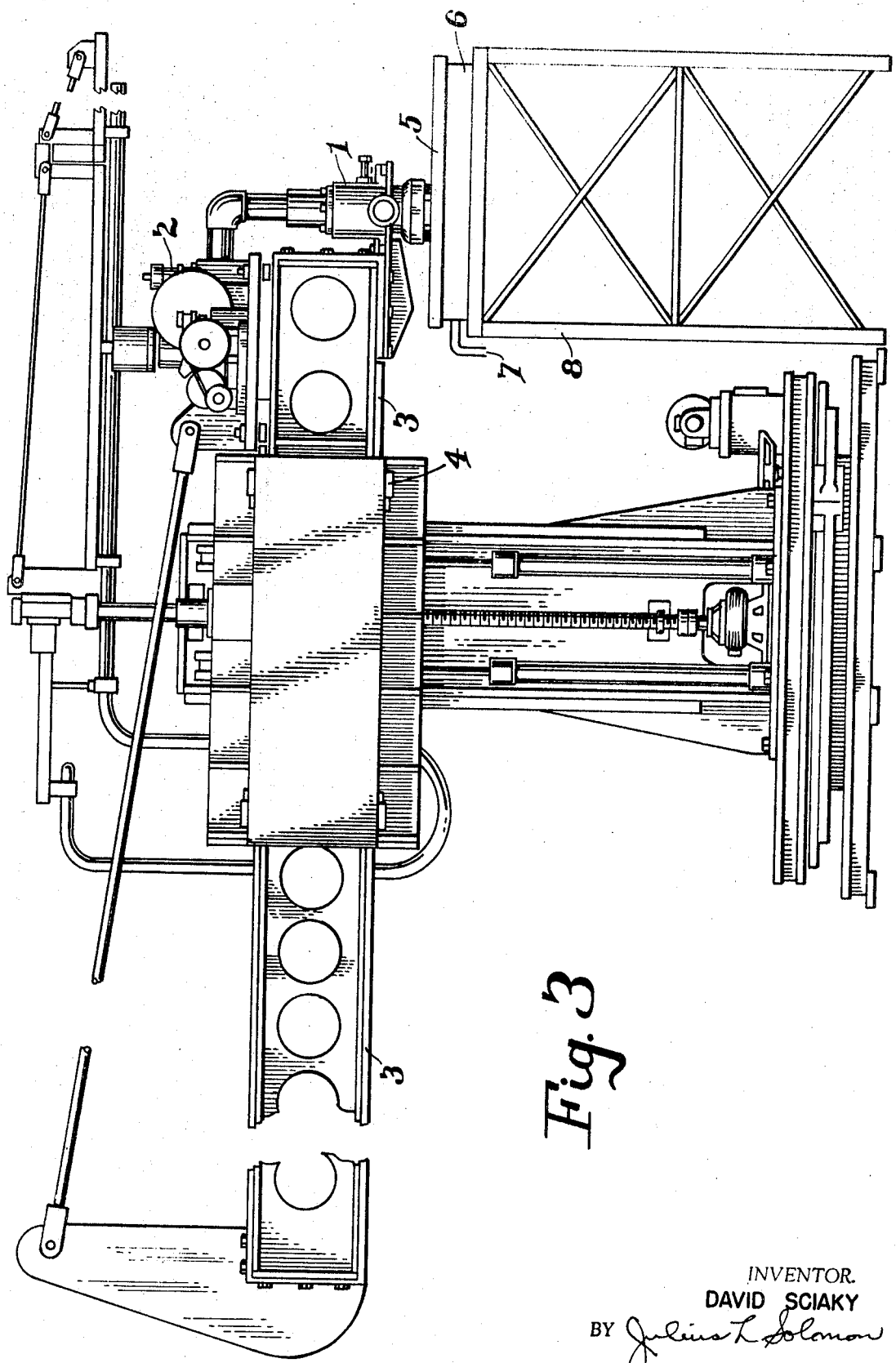
FIG. 3 illustrates a machine which applies the method to the welding of large plates.

FIG. 3 illustrates a machine designed for the purpose of producing longitudinal welds on large plates in accordance with the method of the invention. The gun 1 and its sealing assembly along with its pumping equipment 2 is mounted upon the end of a boom 3 which is arranged to move horizontally by sliding in the bearing housing and support assembly 4. The boom bearing assembly and boom is also arranged to slide in vertical ways and can be raised or lowered by means of a screw-and-jack arrangement to adjust the gun to the height of the workpiece to be welded. The work 5 which has been prepared by a light welding pass for initial sealing of the joint to be welded is fastened to the backup plate 6 which is supported on the table 8. The welding is accomplished, after proper pressures are established in the gun sliding seal carriage and backup plate, by energizing the gun at a suitable voltage and current, focusing the beam and causing the boom to move to the right at the desired rate of speed by means of a suitable electric motor drive.

From the foregoing, it is now evident that a new and improved electron beam welding method is provided which does not require the use of rapidly, cycling vacuum systems while the welding is in progress and by which welding may be accomplished at the same high speeds as is done in the electron beam welding method in high vacuum. Although the welding by the method of the present invention is carried out at pressures of 100 microns, the welding results are substantially as good as the results obtained when welding at pressures of $10^{-4}$ with the parts installed within a large vacuum chamber. The present method allows the welding of large sections; for example, tanks having a diameter of 30—40 feet constructed of 1-inch-thick materials may be welded and the same basic equipment may be adapted to the welding of large, flat plates or plates formed in any contour. It is also possible, not only to weld along a straight line, but to weld along a line of any contour by using either properly shaped tracks or by the use of a seam-tracking device. Having described the method of the invention together with several illustrative embodiments of apparatus for carrying out the method, it is to be understood that the invention is not limited to the forms given in the illustrations. The scope of the invention being set forth in the following claims.

I claim:

1. In an electron beam welding process for welding two abutting sheets, the steps of welding one side of the seam formed by the two abutting edges with a light arc-welding pass, sealing the opposite side and edges of the seam locally about the seam so as to form a small enclosed space around the seam, evacuating the aforesaid small, enclosed space, generating an electron beam in a high-vacuum space, passing said beam through an orifice into an enclosed space at medium pressure, the said enclosed space being bounded in part by a section of the aforesaid sheets, focusing said beam onto the aforementioned lightly arc welded seam so as to weld said seam over the full thickness of the abutted edges.

2. In a welding method, as in claim 1, in which the electron gun and its local chamber along with its pumping equipment is moved along the line of weld so as to weld along the total length of the desired line of weld.

3. In a welding method as in claim 1, in which the pressure in the vicinity of the electron beam gun in which the electron beam is generated, is maintained at a pressure of $10^{-4}$ millimeters of mercury and in which the pressure in the vicinity of the seam to be welded is maintained at approximately 100 microns.

4. In a welding method as in claim 1, in which a first flexible seal is arranged so as to form a continuous seal around the area being welded and a second flexible seal, concentric to the first and arranged at a small distance radially from the first seal, is so arranged as to form a small, annular space between the two seals which is maintained at 100 microns so as to equalize the pressure on both sides of the first seal.